United States Patent

Norkus

Patent Number: 5,118,234
Date of Patent: Jun. 2, 1992

[54] NUT PLATE RETAINER

[75] Inventor: James Norkus, Waterbury, Conn.

[73] Assignee: Buell Industries, Inc., Waterbury, Conn.

[21] Appl. No.: 734,616

[22] Filed: Jul. 23, 1991

[51] Int. Cl.⁵ .............................. F16B 37/04
[52] U.S. Cl. ........................ 411/182; 411/8; 411/104; 411/175; 411/970
[58] Field of Search ........... 411/111, 112, 173, 174, 411/175, 182, 104, 84, 85, 970, 999, 8, 14

[56] References Cited

U.S. PATENT DOCUMENTS

| | | | |
|---|---|---|---|
| 1,835,710 | 12/1931 | Jenkins et al. | 411/84 |
| 1,928,468 | 9/1933 | Tinnereman | 411/174 |
| 2,657,443 | 11/1953 | Hartman | 411/970 |
| 2,860,741 | 11/1958 | Flora | 411/970 |
| 3,073,368 | 1/1963 | Meyer | 411/173 |

FOREIGN PATENT DOCUMENTS 2178126 2/1987 United Kingdom ............ 411/174

Primary Examiner—Neill R. Wilson
Attorney, Agent, or Firm—St. Onge, Steward, Johnston & Reens

[57] ABSTRACT

A nut plate retainer comprises a planar body, nut elements, and at least two orienting tabs. The tabs are formed from and extend parallel to the body. One tab has a locking element having a ramped leading edge and a cutaway trailing edge for snap engagement with an opening in a workpiece. The tabs fit into slots in the workpiece and the nut plate can be moved until the locking element snaps into place in the opening. The nut plate retainer is thereby mounted to the workpiece, and is prevented from rotation or displacement.

7 Claims, 2 Drawing Sheets

NUT PLATE RETAINER

FIELD OF THE INVENTION

The present invention relates to a nut plate having a retaining means for mounting the nut plate to a workpiece.

BACKGROUND OF THE INVENTION

Nut plates are used to provide one or more nut elements to receive threaded fasteners in a backing plate. The nut elements are typically internally threaded barrels which are drawn or punched in the plate. The nut elements are located on the plate to correspond with the location of apertures in a workpiece against which the nut plate is placed. A nut plate is typically used where the workpiece is of a relatively thin material and it is desired to add the reinforcing strength of the plate to the workpiece. A nut plate is also useful to give a large effective washer area when a threaded fastener is threaded into the plate. A nut plate is also desirable as it can provide a plurality of nut elements in a prepositioned assembly. However, when power or pneumatic tools are used to drive fasteners into the nut elements in prior art nut plates, the torque created by the tool can cause twisting and rotation of the nut plate out of its proper position. In particular, a nut plate can be caused to spin around the axis of the nut element. Consequently, loosening and repositioning of the nut plate may be necessary. It is to be appreciated that while this problem can be minimized by hand threading one or more of the fasteners into the nut plate and subsequently power driving the fasteners, that this is more time consuming and less desirable in a large scale assembly line operation. It would be desirable therefore to have a nut plate having a structure and characteristics that avoid these problems, and which is retained in place on a workpiece during driving of a fastener or fasteners into the nut elements of the nut plate.

SUMMARY OF THE INVENTION

It is an object of the invention to provide a nut plate retainer which is adapted for use with power tools and which does not require any special manual threading of a fastener. It is an object of the invention to provide such a nut plate retainer which minimizes problems of spinning of the plate when a fastener is installed in the nut plate retainer with a power or pneumatic tool. It is an object of the invention to provide a nut plate retainer that accomplishes these objects without loss of the backing strength desirable in a nut plate.

A nut plate retainer for mounting to a generally planar workpiece having slots therein in accordance with one embodiment of the invention comprises a planar body, nut means, and at least two orienting tabs. The first orienting tab is a resilient strip that extends generally parallel to the planar body. The first separating tab has a locking element at its free end that has a ramped leading edge and a sharp edged trailing edge that is suited for snap engagement in an opening on the workpiece onto which the nut plate retainer is to be mounted. The first and second tabs are located on the planar body to fit into the slots in the workpiece.

The orienting tabs can be used to mount the nut plate retainer on the workpiece by fitting the tabs into openings in the workpiece and sliding the nut plate retainer relative to the workpiece to fit a portion of the workpiece between the body and the first tab, until the sharp edged trailing edge of the locking element snaps into place in the opening provided for it. The nut plate retainer is thereby prevented from rotation or displacement by virtue of the mounting by the two tabs to the workpiece. Preferably, the first and second tabs are axially aligned, the first and second tabs are respectively located in a middle portion and on a lower edge of the body, and there are three said nut means.

The invention provides a positive audible snap when the locking element drops into its opening in the workpiece. This audible indication of proper mounting permits a consistent and reliable mounting of the nut plate retainer to the workpiece.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENT

Figure 1:
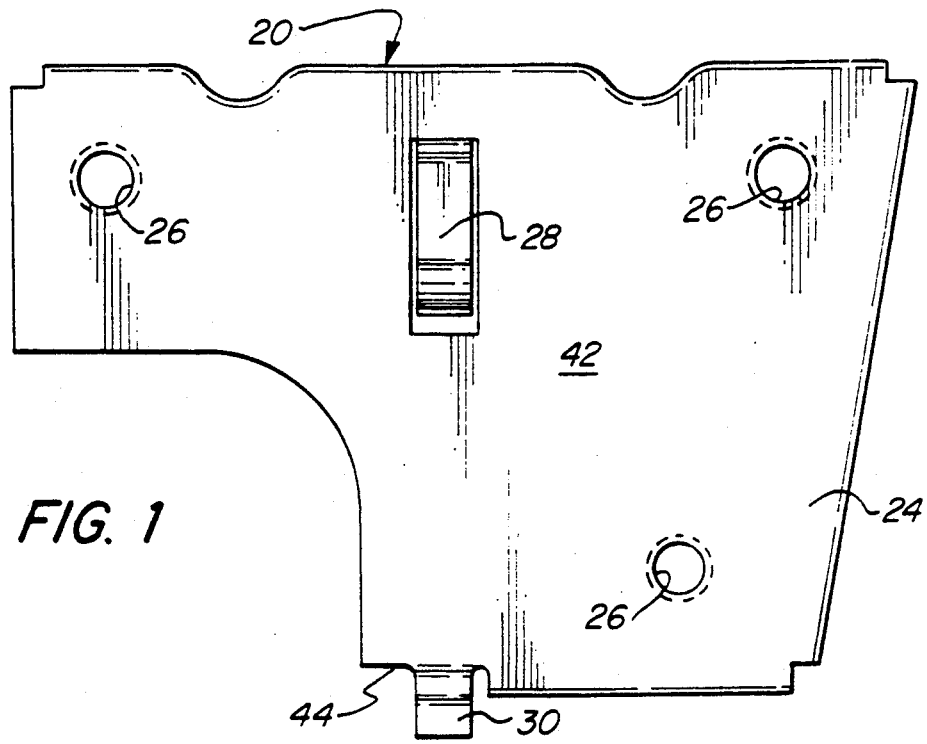
FIG. 1 is a side elevation view of an embodiment of a nut plate retainer in accordance with the invention.
Figure 3:
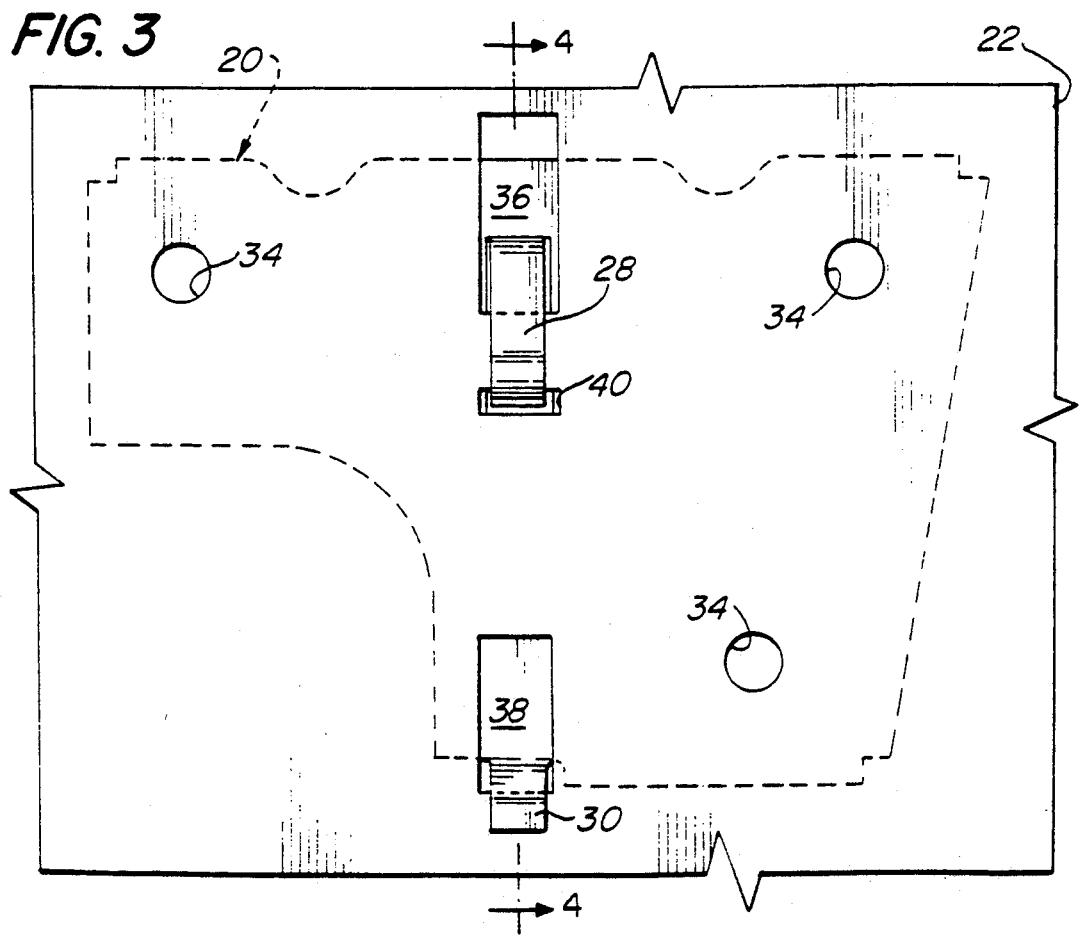
FIG. 3 is an elevation view of the nut plate retainer of FIG. 1 shown mounted to a workpiece.
Figure 2:
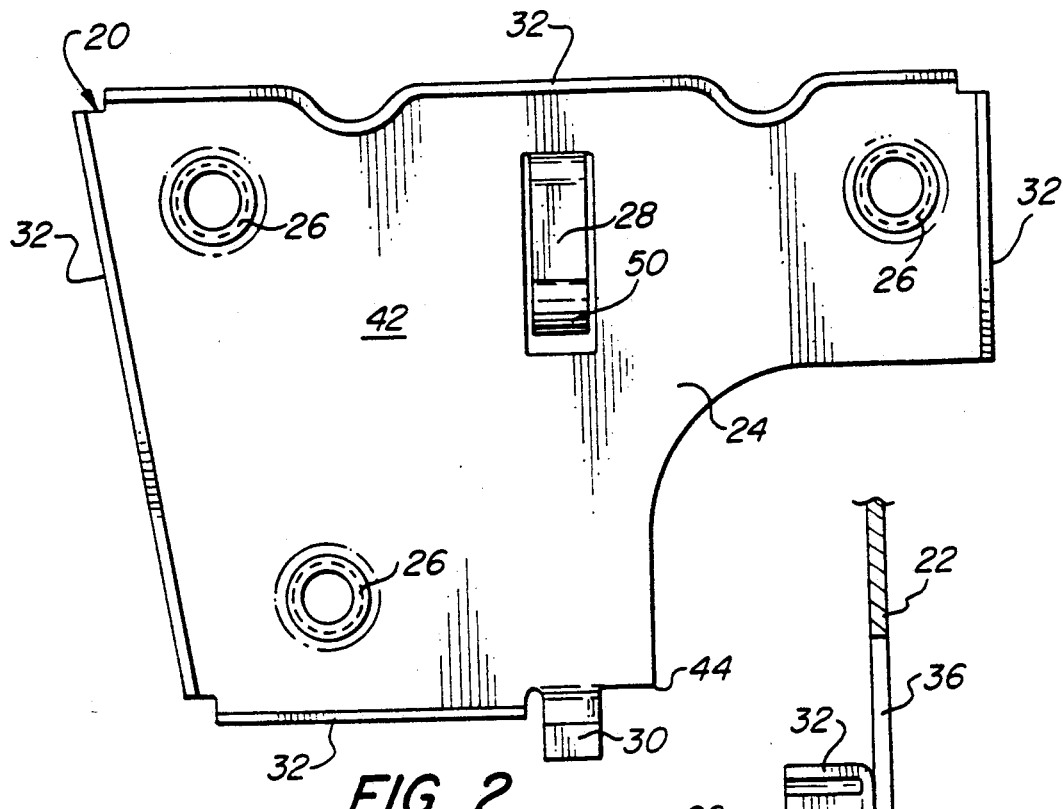
FIG. 2 is an elevation view of the other side of the nut plate retainer of FIG. 1.
Figure 4:
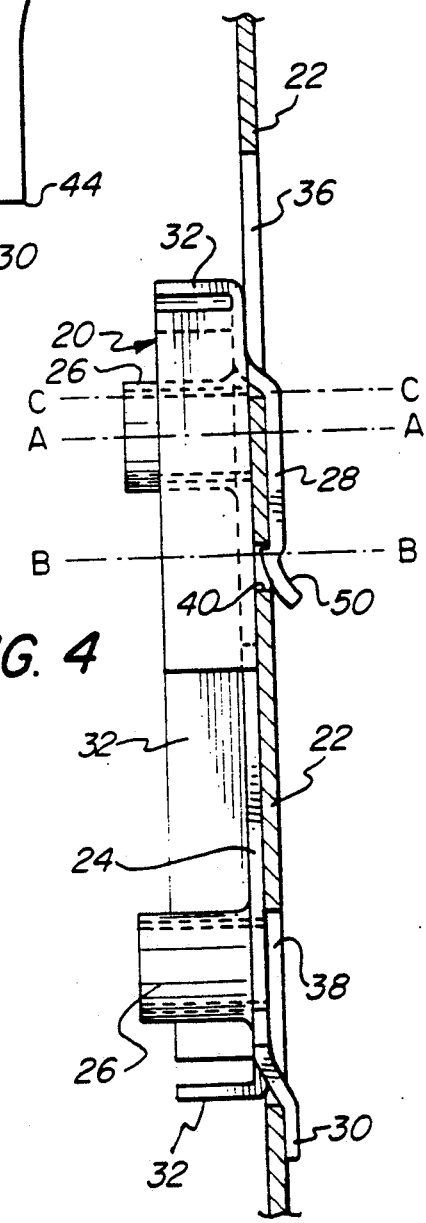
FIG. 4 is a cross-sectional view of the nut plate retainer along line 4—4 of FIG. 3.

Referring now to FIGS. 1-5, a nut plate retainer in accordance with one embodiment of the invention is shown generally as 20. Common numbers in the drawings refer to common elements. Nut plate retainer 20 is adapted to engage and mount on a workpiece 22 such as an automotive body. Nut plate retainer 20 comprises a planar body 24, nut means 26, and at least two orienting tabs 28 and 30.

The planar body 24 is formed of a sheet metal such as carbon steel, and is preferably provided with a perimeter flange 32 to strengthen the body 24 to minimize twisting or warping of body 24. Nut means 26 is for receiving a threaded screw fastener such as a bolt, and preferably comprises an internally threaded barrel. Nut means 26 is preferably drawn from the planar body 24 and tapped to provide the internal threading. However, other nut means such as a steel nut may be substituted by welding or otherwise securing the nut to body 24. Preferably, there are fastener throughholes 34 located in workpiece 22 at locations corresponding to those of the nut means 26 on the body 24. There are preferably three spaced apart nut means 26 provided on the nut plate retainer 20.

The first orienting tab 28 is formed with and is separated by a small distance from the planar body 24. The first orienting tab 28 extends generally parallel to the planar body 24 and has a spring resilience. The second orienting tab 30 is also formed with, separated by a small distance from, and extends generally parallel to the planar body 24. The first and second tabs 28 and 30 are preferably stamped from the body 24. The first and second tabs 28 and 30 are located on the planar body 24 at positions to permit them to be fitted into slots 36 and 38 and opening 40 in the workpiece 22.

Figure 5:
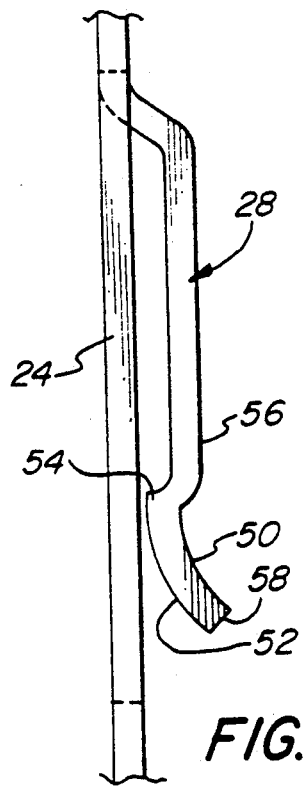
FIG. 5 is a detail cross-sectional view of the first orienting tab of the nut plate retainer of FIG. 1.

As can be seen in FIG. 5, first orienting tab 28 has a locking element 50 provided at its lower end. Locking element 50 has a ramped leading edge 52 and a cutaway trailing edge 54. The ramped leading edge 52 is preferably a curved surface that is suitable to ride up on the workpiece sheet that is fitted in between the first tab 28 and the body 24. The curved leading edge 52 extends from the free end 58 to the trailing edge 54. Trailing edge 54 has a sharp edge to give a sudden cutaway. A flat strip 56 extends from the trailing edge 54 to connect to the body 24 of nut plate retainer 20. As will be explained in further detail hereafter, trailing edge 54 operates to give the audible snap when the nut plate retainer 20 is installed, and acts to prevent the removal of the nut plate retainer 20 from workpiece 22 when it is installed.

Preferably, the tabs 28 and 30 are axially aligned with each other, one above the other. If so, the slots 36 and 38, and opening 40 are necessarily also so aligned. Preferably, first and second tabs 28 and 30 are respectively located in a middle portion 42 of the body 24 and on a lower edge 44 of the body 24. This provides a sufficient spacing to allow the desired stability and spin prevention when the nut plate retainer 20 is mounted on workpiece 22.

The orienting tabs 28 and 30 can be used to mount the nut plate retainer 20 on the workpiece 22 as follows. The tabs 28 and 30 are fitted into slots 36 and 38 respectively. Slots 36 and 38 are of substantially the same length, which length is determined by length of the longer tab. In the preferred embodiment, tab 28 has a length which is about three times the length of tab 30. Opening 40 is formed in the body 24 at a distance below slot 36 that is about equal to the distance between lines C—C and B—B shown in FIG. 4. Body 24 is moved downwardly relative to the workpiece 22. Ramped leading edge 52 allows the locking element 50 to be deflected as the locking element 50 reaches the lower lip of slot 36, and the locking element 50 slides along the body. A portion of the workpiece 22 thus is fitted between the body 24 and the first tab 28. When locking element 50 reaches the opening 40, the sharply edged cutaway trailing edge 54 suddenly drops into opening 40, giving an audible snap that informs the operator that the nut plate retainer 20 is secured in place. The audible snap is caused by the slapping of the strip 56 against the workpiece 22. The sharp trailing edge 54 also acts as a lock to keep the nut plate retainer 20 from sliding on the workpiece and becoming dislodged. It is desirable for the width of the tabs 28 and 30 to be only slightly less than the width of the slots 36 and 38 into which they fit, in order to give a snug fit. The nut plate retainer 20 is prevented from rotation or displacement by virtue of the engagement of the two tabs 28 and 30 with the slots 36 and 38 and the workpiece 22.

If it is desired to remove the nut plate retainer 20, the first tab 28 is manually lifted to release the trailing edge 54 from engagement with the lip of the opening 40. The nut plate retainer 20 is slid along the workpiece and removed when the tabs 28 and 30 are free of the workpiece.

It is to be appreciated that the invention limits unchecked spinning or other displacement of the nut plate retainer 20 when it is mounted on a workpiece 22 when power and pneumatic tools are being used to drive fasteners into the nut means 26. This minimizes the problems of loosening and repositioning obtained in nut plates lacking the orienting tabs 28 and 30 of the present invention.

Many adaptions of the invention might be devised by the person of ordinary skill in the art, who could by way of example, provide for additional orienting tabs, vary the placement of the orienting tabs, vary the number and placement of the nut means, and vary the shape of the body 24 to non-planar shapes such as curved shapes as necessary to fit against a workpiece. This new invention is not limited to the example described herein, but is encompassed by the many variations within and equivalent to the claims as follows.

I claim:

1. A combination of a nut plate retainer and a workpiece, comprising:
   a workpiece having a first slot and a second slot, and an opening located adjacent said first slot;
   a retainer having
      a planar body;
      at least one nut means for receiving a threaded fastener provided in said planar body;
      a resilient first orienting tab formed with said body and extending generally parallel thereto, said first tab being engageable with said first slot;
      a second orienting tab extending from and generally parallel to said planar body, said second tab being engageable with said second slot; and
      a locking element provided in a free end of said first tab, said locking element including a ramped leading edge and a cutaway trailing edge, said locking element being engageable with said opening by a snap engagement to create an audible indication of engagement;
   said nut plate retainer being mountable on said workpiece by fitting said tabs in said slots and moving said nut plate retainer to fit a portion of said workpiece between said body and said first tab until said trailing edge audibly snaps into said opening.

2. A nut plate retainer in accordance with claim 1, wherein said first and second tabs are generally axially aligned with each other.

3. A nut plate retainer in accordance with claim 2, wherein said first and second tabs are respectively located in a middle portion and on a lower edge of said body.

4. A nut plate retainer in accordance with claim 1, wherein there are three said nut means.

5. A combination of a nut plate retainer and a workpiece, comprising:
   a workpiece having a first slot with an opening adjacent thereto, and a second slot axially aligned with said first slot, said opening being located between said first and second slots, said workpiece having fastener throughholes therein;
   a retainer having
      a planar body;
      at least one nut means for receiving a threaded fastener provided in said planar body, said nut means being located to correspond to the location of said fastener throughholes in said workpiece;
      a resilient first orienting tab formed with said body and extending generally parallel thereto, said first tab being engageable with said first slot;
      a second orienting tab extending from and generally parallel to said planar body, said second tab being engageable with said second slot; and
      a locking element provided in a free end of said first tab, said locking element including a ramped leading edge and a cutaway trailing edge, said locking element being engageable with said opening by a snap engagement to create an audible indication of engagement;

said first and second tabs being axially aligned and located to fit into said slots in said workpiece, and said nut plate retainer being mountable on said workpiece by fitting said tabs in said slots and moving said nut late retainer to fit a portion of said workpiece between said body and said first tab until said trailing edge audibly snaps into said opening, whereby said nut plate retainer is prevented from rotation or displacement.

6. A nut plate retainer in accordance with claim 5, wherein said first and second tabs are respectively located in a middle portion and on a lower edge of said body.

7. A nut plate retainer in accordance with claim 5, wherein there are three said nut means.

* * * * *